United States Patent
Cross et al.

[11] Patent Number: 6,017,571
[45] Date of Patent: Jan. 25, 2000

[54] LOW MOISTURE, STABLE FOOD PRODUCTS AND METHODS OF PREPARING THE SAME

[75] Inventors: James C. Cross, Overland Park; Michael L. Talbot, Lenexa; Andrew L. Nelson, Prairie Village, all of Kans.

[73] Assignee: Shade Foods, Inc., New Century, Kans.

[21] Appl. No.: 09/349,421

[22] Filed: Jul. 7, 1999

Related U.S. Application Data

[63] Continuation-in-part of application No. 09/100,651, Jun. 19, 1998, abandoned.

[51] Int. Cl.[7] .................................................. A23P 1/00
[52] U.S. Cl. ........................... 426/518; 426/96; 426/549; 426/560; 426/443
[58] Field of Search ..................................... 426/580, 582, 426/654, 656, 658, 660, 96, 549, 560, 443, 496, 518

[56] References Cited

U.S. PATENT DOCUMENTS

| | | | |
|---|---|---|---|
| 3,741,774 | 6/1973 | Berwall | 426/582 |
| 3,843,808 | 10/1974 | Ziccarelli | 426/582 |
| 4,343,817 | 8/1982 | Swanson et al. | 426/36 |
| 4,347,258 | 8/1982 | Merkenich et al. | 426/334 |
| 4,444,800 | 4/1984 | Bixby et al. | 426/582 |
| 4,994,296 | 2/1991 | Kiniczky et al. | 426/580 |
| 4,997,669 | 3/1991 | Yokayama et al. | 426/582 |
| 5,356,643 | 10/1994 | Miller et al. | 426/94 |

*Primary Examiner*—Milton Cano
*Attorney, Agent, or Firm*—Hovey, Williams, Timmons & Collins

[57] ABSTRACT

Improved food products including cheeses, fruits, cookie materials, snack chips, and seasonings are provided which are highly shelf-stable and can be stored at room temperatures for long periods of time. The products have a total moisture content of less than about 5% by weight, and more preferably less than about 2% by weight, based on the total weight of the ingredients used in the product. The products of the invention have a water activity of from about 0.2–0.3 and an average particle size of from about 0.0006–0.0012 inches (15–31 microns). The processes by which the products are made comprise subjecting the starting ingredients to two stages of average particle size reduction, wherein the first stage results in an average particle size of less than about 0.0090 inches (229 microns), and the second stage results in an average particle size of from about 0.0006–0.0012 inches (15–31 microns). In one embodiment, the particle size reduction is accomplished via a chocolate roll refining system which includes a two roll pre-refiner and a five roll refiner.

36 Claims, 1 Drawing Sheet

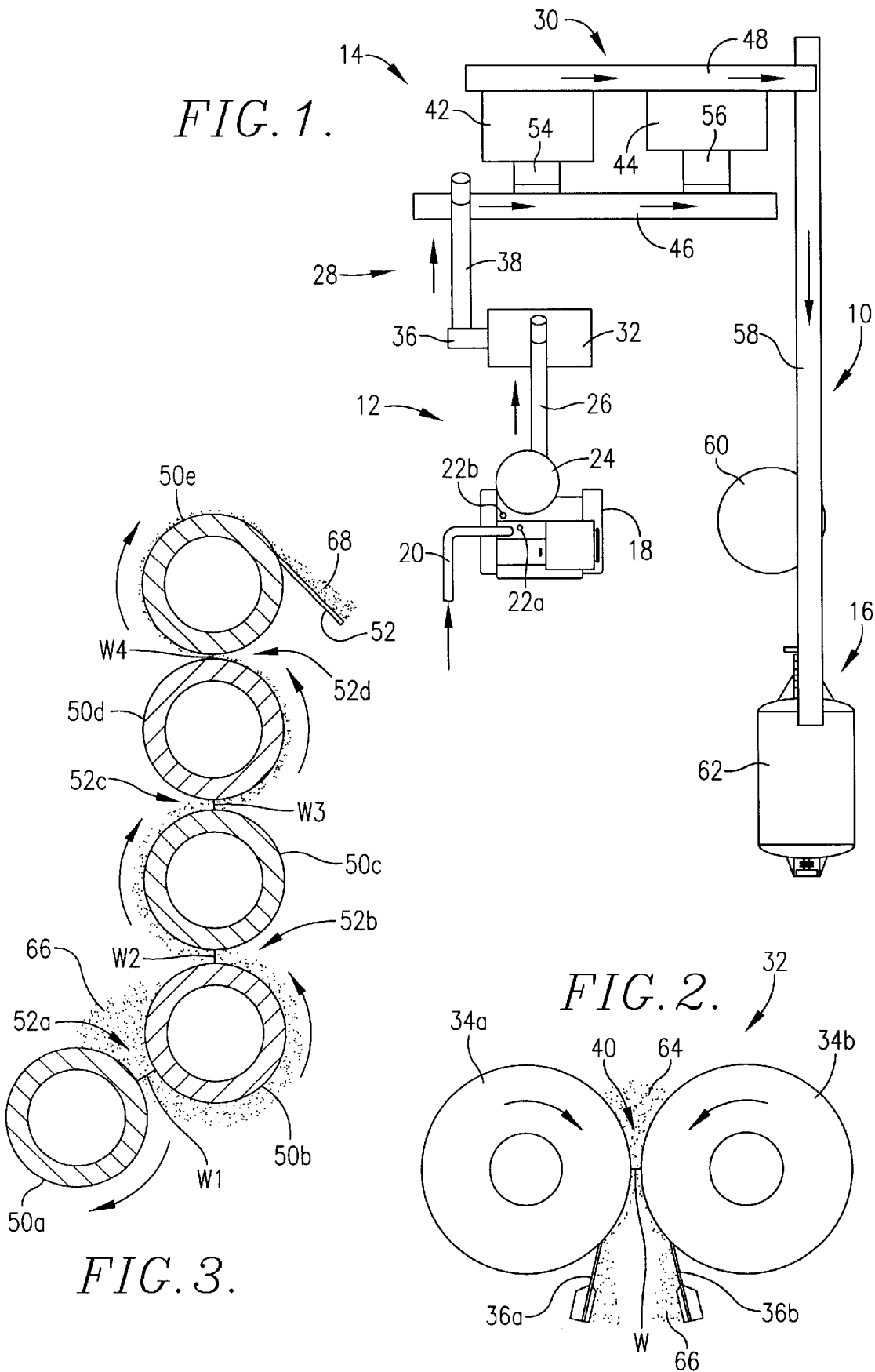

LOW MOISTURE, STABLE FOOD PRODUCTS AND METHODS OF PREPARING THE SAME

RELATED APPLICATIONS

This application is a continuation-in-part of U.S. patent application Ser. No. 09/100,651 filed Jun. 19, 1998 now abandoned.

BACKGROUND OF THE INVENTION

1. Field of the Invention

The present invention is broadly concerned with low moisture, stable food products and a method for making these products. More particularly, the food products include a component selected from the group consisting of snack chips, seasonings, fruits, cheeses, and cookie materials wherein the average particle size of the refined food product is from about 0.0006–0.0012 inches (15–31 microns), and the total moisture content of the product is less than about 5% by weight based on the total weight of the product. The processes by which the products are made preferably include subjecting a quantity of starting ingredients to two distinct steps to reduce the average particle size. Preferably, particle size reduction is accomplished via a refiner system which comprises a two roll pre-refiner that reduces the average particle size to less than about 0.0090 inches (229 microns), and a five roll refiner that reduces the average particle size to about 0.0006–0.0012 inches (15–31 microns).

2. Description of the Prior Art

There are numerous products in the food industry which are useful for enhancing common food products. For example, cookie dough chunks can be added to ice cream, fruit chunks can be added to cereal, and cheese pieces can be baked into breads. However, the products currently available have high moisture and will spoil quickly if not properly stored. For example, most cheese products contain water as an added ingredient. Water, however, adversely affects the shelf stability of the product, thus requiring it to be aseptically packaged or stored under-refrigerated conditions. While cheeses with low moisture contents have been attempted, these products generally lack the consistency and texture which make it appealing to consumers.

Products composed of fats, sugars, dry dairy powders, flavors, colors, and other dry ingredients can be manufactured which are fruit-flavored and fruit-colored. The advantage of these fruit-flavored products is that they are low in moisture and therefore highly shelf-stable, capable of being stored for as long as six months at room temperatures without fear of microbial deterioration. However, these fruit-flavored products do not contain significant quantities of real fruit. Incorporating real fruits directly into fat-based masses at levels greater than 3% causes processing and stability problems due to the high moisture content of fruit. In an attempt to overcome these problems, partially dehydrated fruits are sometimes dried in combination with non-fruit ingredients to improve flowability and prevent clumping. Even these partially dehydrated fruit products contain significant levels of moisture however, and therefore are only marginally better than fresh fruit products in terms of stability.

Cookie dough chunks as used in ice cream and other frozen desserts typically contain raw wheat flour, sugar, water, fat, and other ingredients. However, these cookie dough chunks suffer from the same problems as the cheese and fruit products discussed above. They contain as much as 40% moisture and have a high water activity (approximately 0.9 at 20° C.), thus they must be kept refrigerated or frozen in order to prevent spoiling.

Chocolate is usually produced by a particle size reduction method known as five roll refining. A five roll refiner consists of five rolls, four of which sit directly on top of each other, wherein the first two rolls have an adjustable gap (or roll gap) which allows a thin film of material to move between the two rolls. Each of the succeeding rolls have non-adjustable gaps between them, further allowing a thin film of edible material to move between each of the rolls. Each roll is temperature and pressure controlled and milled so that the particles generated at all points are of substantially equal size. With passage between each of the rolls, the film becomes thinner and the average particle size becomes smaller. In order to enhance the control over particle size, a system of two or five roll refiners can be utilized to pre-refine the material prior to refining. While other suitable methods of particle size reduction exist (such as grinders, hammermills, ball mills, and stone mills), the roll refining system has been the predominant method for manufacturing chocolate.

U.S. Pat. No. 3,843,808 to Ziccarelli is directed towards a process for forming shelf-stable, cheese-flavored products by finely dispersing fat particles and enrobing those fat particles in an enrobing agent to prevent the coalescence of the fat particles. However, the cheese products formed in the Ziccarelli patent have a very coarse, grainy texture which is unappealing in many applications. Furthermore, large quantities of cheese or cheese flavoring is required in the Ziccarelli products in order to obtain a sufficiently strong cheese flavor, resulting in increased product cost. This is due to the fact that the cheese particles are too large and are not uniformly distributed throughout the product.

There is a need for snack chip, cheese, fruit, cookie dough, and seasoned products, and a process for making these products, having a low moisture content and thus being resistant to microbial deterioration. The products must be capable of being stored for long periods of time at room temperature. Furthermore, these products must have a texture and flavor similar to cheese, fruit, or cookie dough products having high levels of moisture. The snack chip flavored products and seasoned products should have a strong, uniformly distributed flavor. Finally, the process for producing these food products must be workable on presently available equipment that is capable of substantially reducing the average particle size of the products thus maintaining a natural texture.

SUMMARY OF THE INVENTION

The present invention overcomes the problems outlined above and provides improved snack chip flavored, cheese, fruit, cookie dough, and seasoned products which are highly shelf-stable for periods of at least about 3 months, and preferably at least about one year, while maintaining an appealing taste and texture. Broadly speaking, the food products of the invention comprise snack chip flavored pieces, fruits, cheeses, cookie materials and/or seasonings, and have an average particle size of from about 0.0006–0.0012 inches (15–31 microns), preferably 0.0007–0.0010 inches (18–25 microns), and more preferably about 0.0008 inches (20 microns). The food products of the invention should have a total moisture content of less than about 5% by weight, and preferably less than about 2% by weight, based on the total weight of the product, wherein from about 10–40% by weight of the water (based on the total moisture content of the product) is bound. The water activity of the food products is from about 0.2–0.3.

The terms "cheese" or "cheeses" as used herein include any conventional cheese, cheese food, simulated cheese, cheese powders, cheese flavorings, or mixtures thereof The terms "fruit" or "fruits" include any fruits and dehydrated fruits, or pieces, powders, or mixtures thereof. The term "cookie" as used herein means baked cookies and/or cookie precursor ingredients; such cookie materials include respective quantities of wheat flour, sugar, and flavoring(s).

The term "seasonings" as used herein includes any known seasonings and flavorings such as chili, garlic ranch, french onion, mustard, black pepper, and mixtures of various seasonings and flavorings. The term "snack chips flavored pieces" as used herein includes any known snack chip such as potato-based chips, corn-based chips, wheat-based chips, multi-grain chips, tapioca-based chips, and mixtures of different types of snack chips.

The food products of the invention normally contain an emulsifier utilized to achieve uniform blending of the ingredients. Any emulsifier typically used in the art is suitable for the products of the invention, with lecithins, monoglycerides, and diglycerides being preferred, and soy lecithin being particularly preferred. Additionally, the food products include at least one fat (as used herein fat includes any fat or oil). Preferably, the fat is a natural fat (e.g., cocoa butter, coconut oil, or butterfat) or a hydrogenated vegetable oil such as palm kernel oil, coconut oil, cottonseed oil, or soybean oil. The concentration of fat in the products is from about 10–65% by weight, preferably 20–60% by weight, and more preferably 45–59% by weight, based on the total weight of the ingredients.

The products of the invention are produced by mixing the desired starting ingredients which include a component selected from the group consisting of snack chips, seasonings, fruits, cheeses, cookie materials, and mixtures thereof with an emulsifier and other ingredients, depending upon the final desired product. Large quantities of the snack chips, seasonings, fruits, cheeses, or cookie materials are not required to achieve a strongly flavored product when practicing the instant invention. Thus, the snack chips, seasonings, fruits, cheeses, and cookie materials need only be present in the ingredients at a level of less than about 30% by weight, preferably from about 15–25% by weight, and more preferably from about 5–7% by weight, based upon the total weight of all ingredients used taken as 100% by weight.

These ingredients are fed into a chocolate-style kneader followed by addition of the melted fat. The ingredients are mixed for at least about 15 minutes, until all of the particles are substantially wet with the melted fat. The thoroughly mixed ingredients are then subjected to a particle size reduction process wherein the final product will have an average particle size within the ranges set forth above. While any particle size reduction process which achieves the above average particle sizes is suitable, particularly preferred is the roll refining process used for chocolate production. The preferred refiner is a five roll refiner.

In another embodiment, the starting ingredient mixture is pre-refined (i.e., subjected to a preliminary average particle size reduction process) after mixing and prior to refining. The preferred pre-refiner is a two roll refiner as is used in chocolate production. During the prerefining step, the mixture emerging from the pre-refiner should have an average particle size of less than about 0.0090 inches (229 microns), and preferably from about 0.0043–0.0086 inches (108–223 microns). While the preferred pre-refining and refining setup of the invention is a two roll pre-refiner followed by at least one five roll refiner(s), those skilled in the art will appreciate that any combination of roll refiners which achieves the uniquely small average particle sizes is suitable for use in the invention.

The preferred average particle size ranges of the products of the invention are summarized in the following table:

| | Average Particle Size of Mixture After Pre-Refining | Average Particle Size of Mixture After Refining |
|---|---|---|
| Broad Range | < about 0.0090 inches | about 0.0006–0.0012 inches |
| Preferred Range | about 0.0043–0.0086 inches | about 0.0007–0.0010 inches |
| Most Preferred | about 0.0058 inches | about 0.0008 inches |

BRIEF DESCRIPTION OF THE DRAWINGS

FIG. 1 is a plan view of the refining assembly setup;

FIG. 2 is a schematic drawing of the two roll pre-refiner utilized in the pre-refiner of FIG. 1; and FIG. 3 is a schematic drawing of the five roll final refiners utilized in the refiner of FIG. 1.

DETAILED DESCRIPTION OF THE PREFERRED EMBODIMENTS

Turning now to the drawings, a refining assembly 10 is illustrated in FIG. 1. Broadly speaking, the assembly 10 includes a mixing section 12, a refiner section 14, and a finishing section 16.

The mixing section 12 includes a kneader 18, an ingredient inlet 20, optional ingredient inlets 22a, 22b, a hopper 24, and an auger 26.

In the embodiment illustrated, the refiner section 14 is made up of a pre-refining assembly 28 and a refining assembly 30. The assembly 28 includes a two roll pre-refiner 32, a horizontal auger 36, and an inclined auger 38. The pre-refiner 32 is configured to present an upwardly opening ingredient inlet (not shown) and is positioned beneath the auger 26 at the end remote from kneader 18. The pre-refiner 32 includes axially rotatable metallic rolls 34a, 34b and scraper blades 36a, 36b (see FIG. 2). Rolls 34a and 34b are rotatable in the directions indicated by the arrows (i.e., in opposite directions towards one another) and are spaced apart from one another at a distance forming a feed roll gap 40 of a width "W".

The assembly 30 includes five roll refiners 42, 44, an upper horizontal input conveyer 46, and a lower horizontal output conveyer 48. Refiners 42, 44 include upwardly extending inlet chutes 54, 56 (FIG. 1), axially rotatable metallic rolls 50a–50e (FIG. 3), and scraper blade 52 (FIG. 3). Rolls 50a–50e are rotatable in the directions indicated by the arrows in FIG. 3. Furthermore, rolls 50a–50e are preferably spaced apart from one another at such a distance so as to form feed roll gaps 52a–52d each having respective widths of "$W_1$–$W_4$", wherein $W_1 > W_2 > W_3 > W_4$. Chutes 54, 56 are configured to present upwardly opening ingredient inlets adjacent conveyer 46 (not shown). Refiners 42, 44 are configured to present downwardly projecting ingredient outlets adjacent conveyer 48 (not shown). Section 16 has an upwardly projecting, refined-ingredient exit conveyer 58, a steel mixing vat 60, and a steel holding tank 62. Conveyer 58 connects conveyer 48 of assembly 30 to tank 62, thus tank 62 is located at one end of conveyer 58 while conveyer 48 of assembly 30 is situated at the end of conveyer 58 remote from tank 62. Vat 60 is positioned adjacent to conveyer 58, intermediate tank 62 and assembly 30.

In typical operations employing refiners in accordance with the invention, an edible mixture to be refined is first formulated by feeding the desired amounts of the various ingredients into the kneader 18. This can be achieved via inlets 20, 22a, 22b, or hopper 24. One could use any combination of the foregoing to feed the ingredients into kneader 18 as required by the particular product being made. Furthermore, the ingredients used will vary depending upon the desired final product.

Once all of the dry ingredients have been placed in kneader 18, they are mixed for 5 to 10 minutes at a temperature of at least about 38° C. at which time a small amount of oil (e.g., from about 5–20% by weight based on the total weight of ingredients used) is added, and the resulting mixture is mixed until substantially all of the dry ingredients are wet with oil (from about 15–30 minutes). After mixing, the paste-like mixture is discharged from a gate (not shown) in the bottom of the kneader into auger 26 which delivers the mixture upwardly to the inlet on top of pre-refiner 32. The paste (represented by paste 64 in FIG. 2) is fed between rolls 34a, 34b, each of which are axially rotating inwardly and downwardly in the directions indicated by the arrows, thus forcing the paste through gap 40 between rolls 34a, 34b. The width "W" of gap 40 should be set so that the mixture emerging from pre-refiner 32 has an average particle size of less than about 0.0090 inches (23 microns), and preferably about 0.0043–0.0086 inches (108–223 microns). The pressure between rolls 34a, 34b should be maintained between about 435–580 psi, and the temperature of the rolls 34a, 34b should be between about 30–40° C. Preferably, the pressure between rolls 34a, 34b is from about 435 to about 580 psi, and the temperature of the rolls 34a, 34b is from about 20° C. to about 40° C. In order to facilitate the passage of ingredients between rolls 34a, 34b, the rolls should be maintained at different rotation speeds. One of rolls 34a, 34b rotates 15–25% faster than the other of said rolls (i.e., the roll speed ratio, or [speed of roll 34a]/[speed of roll 34b], is about 1.15–1.25).

As the pre-refined paste (represented by paste 66 in FIG. 2) emerges from gap 40, it is removed (i.e., "scraped") from rolls 34a, 34b by blades 36a, 36b respectively, and deposited on auger 36 which transfers the paste to auger 38. Upon passage from auger 36 to auger 38, the pre-refined paste 66 is transported upwardly to conveyer 46 of assembly 30. Conveyer 46 then carries the paste 66 and deposits it into chutes 54, 56 of refiners 42, 44 for further particle size reduction. Upon passage through chutes 54, 56, paste 66 is fed between rolls 50a and 50b (represented by paste 66 in FIG. 3). Each of rolls 50a, 50b are axially rotating, inwardly and downwardly in the directions indicated by the arrows, thus forcing paste 66 through gap 52a between rolls 50a, 50b. Because roll 50b rotates 200–300% faster than roll 50a, paste 66 forms a film on roll 50b which is then fed between rolls 50b, 50c. Similar to previous discussions, rolls 50b, 50c are axially rotating towards one another in the directions indicated by the arrows, thus forcing paste 66 through gap 52b and forming an even thinner film of paste 66 on roll 50c. This set-up and process is repeated as the paste is passed between each of the succeeding rolls.

The rotation speeds of rolls 50a–50e from fastest to slowest are as follows: 50e>50d>50c>50b>50a. Because each succeeding roll rotates faster than the roll just prior to it, the paste 66 is transferred from roll to roll while being pulled between each progressively smaller feed gap 52a–52d. The paste 66 forms a film on the rolls that becomes progressively thinner on the roll at a rate inversely proportional to the increase in roll speeds. At the same time, the particle size of the paste becomes progressively smaller. As the newly refined mixture is removed from roll 50e by blade 52, it is in the form of a fine, dry powder 68.

The Roll Speed Ratio in a five roll refiner is defined as follows: (the speed of roll #5 in rpm)/(the speed of roll #2 in rpm). Preferably, the roll speed ratio ranges from about 3 to about 10, more preferably from about 5 to about 9, and most preferably from about 6 to about 8. The powder 68 that emerges from refiners 42, 44 should have a particle size of about 0.0006–0.0012 inches (15–31 microns), preferably about 0.0007–0.0010 inches (18–25 microns), and more preferably about 0.0008 inches (20 microns).

The preferred roll pressures for the five roll refiners of the invention are set forth in Table 1:

TABLE 1

Roll Pressures in a Five Roll Refiner

| Between Roll #'s | Pressure Range | Preferred Pressure Range |
| --- | --- | --- |
| 1–2 (50a–50b)[a] | 300–900 psi | 300–600 psi |
| 2–3 (50b–50c)[a] | 200–600 psi | 200–350 psi |
| 3–4 (50c–50d)[a] | 200–600 psi | 200–350 psi |
| 4–5 (50d–50e)[a] | 200–600 psi | 200–350 psi |

[a]Refers to the respective rolls of FIG. 3.

The preferred temperatures of the respective rolls in the five roll refiners of the invention are set forth in Table 2 below:

TABLE 2

Roll Temperatures in a Five Roll Refiner

| Roll #'s | Temperature Range | Preferred Temperature Range |
| --- | --- | --- |
| 1 (50a)[a] | 20–40° C. | 25–40° C. |
| 2 (50b)[a] | 20–40° C. | 25–40° C. |
| 3 (50c)[a] | 30–50° C. | 35–48° C. |
| 4 (50d)[a] | 35–60° C. | 45–60° C. |
| 5 (50e)[a] | 25–40° C. | 30–40° C. |

[a]Refers to the respective rolls of FIG. 3.

Upon exiting refiners 42, 44, powder 68 is deposited on conveyer 48 for transport to auger 58 which moves the refined powder 68 to vat 60 and/or tank 62. Vat 60 can optionally be used to mix additional ingredients such as flavorings or colorings with powder 68, after which powder 68 can be transferred to tank 62 or to some other processing machinery, depending upon the final product. Alternately, powder 68 can bypass vat 60 and go directly to tank 62 where a small amount of oil is added to the refined powder, and the resulting mixture is thoroughly mixed.

EXAMPLES

The following examples illustrate preferred aspects of the present invention. It is to be understood, however, that these examples are presented by way of illustration only, and nothing therein should be taken as a limitation upon the overall scope of the invention.

Example 1

Cookie Dough Flavored Ice Cream Coating

The following ingredients were used to prepare a cookie dough flavored ice cream coating:

| Ingredients Added To Kneader Mixer | Concentration % wt.[a] |
|---|---|
| ground vanilla cookies | 18.0 |
| granulated sugar | 19.8 |
| whey solids | 2.0 |
| salt | 0.1 |
| soy lecithin | 0.2 |
| 76 degree coconut oil[b] | 8.0 |
| Ingredients Added After Refining | Concentration % wt.[a] |
| soy lecithin | 0.3 |
| vanilla flavor | 0.1 |
| 76 degree coconut oil[b] | 51.5 |

[a]Percent by weight based upon the total weight of ingredients used (i.e., ingredients added to the kneader mixer plus the ingredients added after refining).
[b]"76 degree" refers to the melting point of the oil in ° F.

Vanilla cookies were purchased whole from a bakery and ground using a Fitz type mill until all of the final pieces could pass through a #6 Taylor U.S. Screen. The ground cookies, granulated sugar, whey solids, salt, oil, and soy lecithin were added to a hot water jacketed Buhler SMC-1500 chocolate style kneader equipped with dual paddles and temperature controls (all Buhler equipment is available from Buhler, Inc. in Minneapolis, Minn.). The 8.0% by weight of coconut oil was added to the kneader at 46° C., and the entire kneader system was water jacket heated to 49° C. The ingredients were mixed until all of the dry particles were thoroughly wet with oil (approximately 15–30 minutes). After mixing, the mixture had a temperature of 48° C.

The coarse dough-like mixture was transferred from the kneader via a heated auger at a temperature of 46° C. to a Buhler-Miag SZA-900 two roll pre-refining system. The temperature of the rolls was cooled to approximately 21–24° C. Upon exiting the pre-refiner, the particle size of the material had been reduced to about 0.002–0.003 inches (50–70 microns). The mixture, which had a dry consistency and a temperature of approximately 46° C., was moved by steel belts to the finishing refiners.

The finishing refiners consisted of two, Buhler SFL-1300 five roll refiners with independent pressure and temperature controls. The roll pressures and temperatures used in this example were as follows:

| Between Roll #'s | Pressure | Roll # | Temperature |
|---|---|---|---|
| 1–2 | 600 psi | 1 | 35° C. |
| 2–3 | 300 psi | 2 | 35° C. |
| 3–4 | 300 psi | 3 | 40° C. |
| 4–5 | 300 psi | 4 | 50° C. |
|  |  | 5 | 35° C. |

After passing through the finishing refiners, the particles of the mixture had an average size of about 0.0008–0.0010 inches (20–25 microns). The exiting mixture (having a temperature of 36° C. and a free-flowing powdery consistency) was transported on a metal belt past a series of magnets which removed any dust-sized metal fragments.

The steel belts delivered the powder to a conventional horizontal, jacketed mixing tank fitted with paddle-type agitators. A small amount of coconut oil was added to the powder mixture to form a thick slurry which was mixed for approximately 20 minutes at 49° C. After mixing, the remainder of the coconut oil (which had been heated to 46° C.) was added to the mixture in the tank followed by 40 minutes of mixing, while continuing to maintain the temperature at 49° C.

Finally, the product was tested for color, flavor, viscosity, and particle size. The final product had a Brookfield viscosity of 350 c.p. at 10 rpm and 38° C. and an average particle size of 0.0009 inches (23 microns). All viscosities determined herein were measured on Brookfield viscometers at 10 rpm spindle speed.

Example 2

Cheddar Cheese Flavored Shreds

The following ingredients were used to prepare cheddar cheese-flavored shreds:

| Ingredients Added To Kneader Mixer | Concentration % wt.[a] |
|---|---|
| cheddar cheese powder | 20.0 |
| salt | 0.8 |
| lactic acid | 2.6 |
| maltodextrin | 34.1 |
| 100 degree partially hydrogenated palm kernel oil[b] | 23.0 |
| soy lecithin | 0.15 |
| oat flour | 3.0 |
| whey solids | 10.0 |
| Ingredients Added After Refining | Concentration % wt.[a] |
| soy lecithin | 0.15 |
| mono- & di-glycerides | 0.2 |
| 100 degree partially hydrogenated palm kernel oil[b] | 6.0 |

[a]Percent by weight based upon the total weight of ingredients used (i.e., ingredients added to the kneader mixer plus the ingredients added after refining).
[b]"100 degree" refers to the melting point of the oil in ° F.

The same equipment was used in this production run as was used in Example 1. The cheese powder, salt, lactic acid, maltodextrin, lecithin, whey, and oat flour were added to a chocolate style kneader. The jacketed kneader was water heated to, and maintained at, 49° C. The dry ingredients were blended for about three minutes to ensure thorough distribution of the cheese powder, after which 23.0% by weight of palm kernel oil was added at a temperature of 50° C. The addition of the 23.0% by weight oil (which equals 24.5% by weight based on the total weight of ingredients added to the kneader) was critical for ensuring optimum small particle size and excellent particle size distribution. The resulting material was mixed until the dry material was completely mixed with oil (about 20 minutes). The final mixed ingredients were then transported via a jacketed auger at a temperature of 49° C. to a two roll pre-refiner. The average particle size of the product upon exiting the pre-refiner was 0.002 inches (50 microns). The prerefined material was then transported to a five roll refiner at a temperature of 46° C.

The roll pressures and temperatures used in this example were as follows:

| Between Roll #'s | Pressure | Roll # | Temperature |
|---|---|---|---|
| 1–2 | 600 psi | 1 | 35° C. |
| 2–3 | 300 psi | 2 | 35° C. |
| 3–4 | 300 psi | 3 | 40° C. |
| 4–5 | 300 psi | 4 | 50° C. |
|  |  | 5 | 35° C. |

After refining, the average particle size of the exiting product (having a temperature of 37° C.) was 0.0006 inches (15 microns). The refined material, which had a semi-plastic like consistency, was then delivered by steel belts to a water-jacketed horizontal mixer with a jacket temperature of 49° C. The emulsifiers (i.e., the lecithin and mono- and diglycerides) were added to the refined material and the resulting mixture was mixed for approximately 20 minutes at a temperature of 47° C. After mixing, the remainder of the oil was added, and the mixture was again mixed for about 30 minutes at 49° C.

The product was then tested for fineness, flavor, color, and viscosity. The final product had a viscosity of 76,000 c.p. at 49° C. and an average particle size of 0.0006 inches (15 microns). The product was then placed on a fiber belt and passed through a cooling tunnel having three cooling zones with temperatures as follows: first cooling zone—10° C.; second cooling zone—10° C.; and third cooling zone—18° C. Upon exiting the cooling tunnel, rotating blades chopped the strips into cheese-like pieces. These pieces were then shaken in order to eliminate dust and packaged in a room where the temperature was 13° C.

Example 3

Ice Cream Coating

The following ingredients were used to prepare an ice cream coating made with raspberry fruit powder:

| Ingredients Added To Kneader Mixer | Concentration % wt.[a] |
|---|---|
| granulated sugar | 24.9 |
| freeze-dried raspberry powder | 10.0 |
| non-fat milk powder | 5.0 |
| soy lecithin | 0.2 |
| 76 degree coconut oil[b] | 8.0 |

| Ingredients Added After Refining | Concentration % wt.[a] |
|---|---|
| 76 degree coconut oil[b] | 45.5 |
| soybean oil | 1.0 |
| 92 degree coconut oil[b] | 5.0 |
| vanilla flavor | 0.1 |
| soy lecithin | 0.3 |

[a]Percent by weight based upon the total weight of ingredients used (i.e., ingredients added to the kneader mixer plus the ingredients added after refining).
[b]"76 degree" and "92 degree" refers to the melting point of the respective oils in ° F.

The same equipment was used in this production run as was used in Example 1. The freeze-dried raspberry powder, granulated sugar, non-fat milk powder, and soy lecithin were added to a chocolate style kneader. The 8.0% by weight of 76 degree coconut oil was added to the kneader at a temperature of 46° C., and the entire kneader system was water jacket heated to 49° C. The ingredients were mixed until all of the dried particles were thoroughly wet with oil (about 15–30 minutes). After mixing, the ingredients had a temperature of 48° C. The coarse dough-like mixture was transferred from the kneader via a heated auger at a temperature of 46° C. to a two roll pre-refiner. The temperature of the rolls of the pre-refiner was cooled to approximately 21–24° C. Upon exiting the pre-refiner, the particle size of the material had been reduced to 0.002–0.003 inches (50–70 microns). The mixture was of a dry consistency and had a temperature of about 115° F. The pre-refined material was then transported to a five roll refiner. The roll pressures and temperatures used in this example were as follows:

| Between Roll #'s | Pressure | Roll # | Temperature |
|---|---|---|---|
| 1–2 | 600 psi | 1 | 35° C. |
| 2–3 | 600 psi | 2 | 35° C. |
| 3–4 | 200 psi | 3 | 40° C. |
| 4–5 | 300 psi | 4 | 50° C. |
|  |  | 5 | 35° C. |

After refining, the average particle size of the exiting product was 0.0008–0.0010 inches (15–20 microns). The refined material, which had a free-flowing powdery consistency, was then transported on a steel belt past a series of magnets in order to remove any dust-sized metal fragments. The steel belt then delivered the powder to a water-jacketed horizontal mixer with a jacket temperature of 120° F. A small amount of oil was added to the powder to form a thick slurry with the resulting slurry being mixed for about 20 minutes while maintaining the temperature at 120° F. After mixing, the remainder of the coconut oil (at a temperature of 115° F.) was added and the product was mixed for another 40 minutes.

The product was then tested for color, flavor, viscosity, and particle size. The final product had a viscosity of 300 c.p. at 100° F. and an average particle size of 0.0009 inches.

Example 4

Cheese Product Formulations

The following table sets forth various cheese and cheese-flavored products which can be produced following the processes of the invention:

| Ingredients | % BY WEIGHT BASED ON TOTAL WEIGHT OF ALL INGREDIENTS | | | | | |
|---|---|---|---|---|---|---|
|  | 1[a] | 2[b] | 3[c] | 4[d] | 5[e] | 6[f] |
| Cheese Powder | 20.00 | 20.00 | 6.00 | 6.00 | 0.00 | 0.00 |
| Salt | 0.80 | 0.80 | 0.80 | 0.80 | 0.80 | 0.80 |
| Lactic Acid | 2.60 | 2.60 | 2.60 | 2.60 | 2.60 | 2.60 |
| Maltodextrin | 34.10 | 18.10 | 29.27 | 13.27 | 29.90 | 22.00 |
| Oil (Palm Kernel, Cottonseed, Soybean, Coconut, or Butterfat) | 29.00 | 45.00 | 29.00 | 45.00 | 29.00 | 45.00 |
| Lecithin | 0.30 | 0.30 | 0.30 | 0.30 | 0.30 | 0.30 |
| Oat Flour | 3.00 | 3.00 | 3.00 | 3.00 | 3.00 | 3.00 |
| Whey Solids | 10.00 | 10.00 | 28.00 | 28.00 | 24.10 | 24.00 |
| Mono & Di-glycerides | 0.20 | 0.20 | 0.20 | 0.20 | 0.20 | 0.20 |
| FD&C Yellow #6 | 0.00 | 0.00 | 0.03 | 0.03 | 0.10 | 0.10 |
| Cheese Flavor | 0.00 | 0.00 | 0.80 | 0.80 | 2.00 | 2.00 |
| Oat Fiber | 0.00 | 0.00 | 0.00 | 0.00 | 8.00 | 0.00 |

[a]High cheese powder pieces for use with any type of cheese powder including mozzarella, parmesan, colby, etc.
[b]High cheese powder enrobing product for coating biscuits.
[c]Low cheese powder pieces with added flavor and color.
[d]Low cheese powder enrobing product with added flavor and color.
[e]Cheese flavored and colored pieces. No cheese powder added.
[f]Cheese flavored and colored enrobing product. No cheese powder added.

Example 5

Dried Fruit Products

The following table sets forth various ingredient formulations which can be used in the processes of the invention:

|  | % By Weight Based on the Total Weight of Ingredients | | | | |
|---|---|---|---|---|---|
| Ingredients | 1[a] | 2[b] | 3[c] | 4[d] | 5[e] |
| White Sugar | 44.70 | 36.85 | 44.90 | 24.90 | 39.90 |
| Dextrose Monohydrate | 5.00 | 0.00 | 0.00 | 0.00 | 0.00 |
| Apple Powder | 15.00 | 0.00 | 0.00 | 0.00 | 0.00 |
| Banana Powder | 0.00 | 18.00 | 0.00 | 0.00 | 0.00 |
| Cherry Powder | 0.00 | 0.00 | 15.00 | 0.00 | 0.00 |
| Raspberry Powder | 0.00 | 0.00 | 0.00 | 10.00 | 0.00 |
| Strawberry Powder | 0.00 | 0.00 | 0.00 | 0.00 | 15.00 |
| Nonfat Milk Powder | 5.00 | 10.00 | 10.00 | 5.00 | 10.00 |
| Citric Acid | 0.00 | 0.05 | 0.10 | 0.00 | 0.00 |
| Malic Acid | 0.20 | 0.00 | 0.00 | 0.00 | 0.00 |
| Cinnamon Powder | 0.10 | 0.00 | 0.00 | 0.00 | 0.00 |
| Vanilla Flavor | 0.00 | 0.10 | 0.00 | 0.10 | 0.10 |
| Palm Kernel Oil (96)[a] | 29.90 | 34.80 | 0.00 | 0.00 | 34.80 |
| Coconut Oil (92)[a] | 0.00 | 0.00 | 19.80 | 5.00 | 0.00 |
| Coconut Oil (76)[a] | 0.00 | 0.00 | 10.00 | 53.50 | 0.00 |
| Soybean Oil (40)[a] | 0.00 | 0.00 | 0.00 | 1.00 | 0.00 |
| Soy Lecithin | 0.10 | 0.20 | 0.20 | 0.50 | 0.20 |

[a]The number in parenthesis designates the melting point of the oil in ° F.

Example 6

Cookie Dough Chips

The following table sets forth two recipes for making cookie dough chunks and drops for use in frozen desserts:

|  | % By Weight Based on the Total Weight of the Ingredients | |
|---|---|---|
| Ingredient | Example 1 | Example 2 |
| White Sugar (Granulated) | 24.60 | 36.00 |
| Brown Sugar | 0.00 | 5.00 |
| Ground Vanilla Cookies | 40.00 | 0.00 |
| Wheat Flour | 0.00 | 15.00 |
| Nonfat Dried Milk | 0.00 | 5.00 |
| Whey Powder | 2.00 | 5.00 |
| Cocoa Powder | 0.00 | 0.50 |
| Salt | 0.20 | 0.20 |
| Vanilla Flavor | 0.10 | 0.20 |
| Palm Kernel Oil (96)[a] | 5.00 | 5.00 |
| Coconut Oil (76)[a] | 20.00 | 20.00 |
| Cottonseed Oil (32)[a] | 8.00 | 8.00 |
| Soy Lecithin | 0.10 | 0.10 |

[a]The number in parenthesis refers to the melting point of the oil in ° F.

Example 7

Cookie Dough Coatings

The following table sets forth the ingredients for making cookie dough coatings for frozen dessert applications:

|  | % By Weight Based on Total Weight of the Ingredients | | | | |
|---|---|---|---|---|---|
| Ingredient | 1[a] | 2[b] | 3[c] | 4[d] | 5[e] |
| Sugar (granulated) | 19.80 | 21.80 | 22.30 | 19.80 | 28.80 |
| Ground Vanilla Cookies | 18.00 | 20.00 | 15.00 | 18.00 | 25.00 |
| Nonfat Milk Powder | 0.00 | 1.00 | 0.00 | 0.00 | 0.00 |
| Whey Powder | 2.00 | 2.00 | 2.50 | 2.00 | 3.00 |
| Salt | 0.10 | 0.10 | 0.10 | 0.10 | 0.10 |
| Vanilla Flavor | 0.10 | 0.10 | 0.10 | 0.10 | 0.10 |
| Palm Kernel Oil(96)[f] | 0.00 | 0.00 | 0.00 | 6.00 | 5.00 |
| Coconut Oil(92)[f] | 0.00 | 0.00 | 10.00 | 0.00 | 19.90 |
| Coconut Oil(76)[f] | 59.50 | 52.50 | 48.50 | 45.80 | 0.00 |
| Soybean Oil(40)[f] | 0.00 | 2.00 | 1.00 | 0.00 | 18.00 |
| Cottonseed Oil(32)[f] | 0.00 | 0.00 | 0.00 | 8.00 | 0.00 |
| Soy Lecithin | 0.50 | 0.50 | 0.50 | 0.20 | 0.10 |

[a]Cookie dough dip coating for frozen novelties.
[b]Cookie dough enrobing coating for stickless frozen products.
[c]Cookie dough spray coating for atomizing and spraying onto the surface of or inside of ice cream products.
[d]Cookie dough core filling mass for forming a fat-base core inside a frozen novelty product.
[e]Cookie dough liquid chip coating for injecting into ice cream.
[f]The number in parenthesis designates the melting point of the oil in ° F.

Example 8

Cookie Dough Flavor Variants

The following table illustrates three formulations for obtaining coffee flavored, chocolate flavored, and chocolate, mint- flavored cookie dough using the processes of the invention:

|  | % By Weight Based on Total Weight of the Ingredients | | |
|---|---|---|---|
| Ingredient | Coffee Flavored | Chocolate-Flavored | Chocolate, Mint-Flavored |
| Sugar | 35.60 | 31.70 | 31.60 |
| Brown Sugar | 0.00 | 5.00 | 5.00 |
| Wheat Flour | 15.00 | 20.00 | 20.00 |
| Whole Milk Powder | 15.00 | 0.00 | 0.00 |
| Nonfat Dried Milk | 0.00 | 5.00 | 5.00 |
| Cocoa Powder (natural) | 0.50 | 4.00 | 4.00 |
| Cocoa Powder (alkalized) | 0.00 | 8.00 | 8.00 |
| Instant Coffee Powder | 3.50 | 0.00 | 0.00 |
| Vanilla Flavor (liquid) | 0.20 | 0.10 | 0.10 |
| Peppermint Oil | 0.00 | 0.00 | 0.10 |
| Cocoa Butter (96)[a] | 1.00 | 1.00 | 0.00 |
| Coconut Oil (92)[a] | 0.00 | 0.00 | 2.00 |
| Coconut Oil (76)[a] | 28.00 | 15.00 | 19.00 |
| Soybean Oil (40)[a] | 1.00 | 10.00 | 5.00 |
| Soy Lecithin | 0.20 | 0.20 | 0.20 |

[a]The number in parenthesis designates the melting point of the oil in ° F.

Example 9A

Chili Flavored Coating

The following ingredients were used to prepare a chili flavored coating:

| Ingredients Added To Kneader Mixer | Concentration % wt.[a] |
|---|---|
| palm kernel oil | 20.0 |
| soy lecithin | 0.10 |
| all purpose flour | 33.17 |
| whey | 32.41 |
| salt | 0.94 |
| McCormick Chili Seasoning Flavor | 6.0 |

-continued

| Ingredients Added After Refining | Concentration % wt.[a] |
|---|---|
| palm kernel oil | 14.43 |
| soy lecithin | 0.40 |
| Brown Lake Colors | 1.25 |
| David Michael Chili Flavor | 0.30 |

[a]Percent by weight based upon the total weight of ingredients used (i.e., ingredients added to the kneader mixer plus the ingredients added after refining).

The same equipment was used in this production run as was used in the previous examples. The soy lecithin, flour, whey, salt, and McCormick Chili Seasoning Flavor were added to a chocolate style kneader. The jacketed kneader was water heated to, and maintained at, 49° C. The dry ingredients were blended for about three minutes to ensure thorough distribution of the chili seasoning, after which 20% by weight of palm kernel oil was added at a temperature of 50° C. The addition of the oil was critical for ensuring optimum small particle size and excellent particle size distribution. The resulting material was mixed until the dry material was completely mixed with oil (about 20 minutes). The final mixed ingredients were then transported via a jacketed auger at a temperature of 49° C. to a two roll pre-refiner. The average particle size of the product upon exiting the pre-refiner was 0.002 inches (50 microns). The pre-refined material was then transported to a five roll refiner at a temperature of 46° C.

The roll pressures and temperatures used in this example were as follows:

| Between Roll #'s | Pressure | Roll # | Temperature |
|---|---|---|---|
| 1–2 | 600 psi | 1 | 35° C. |
| 2–3 | 300 psi | 2 | 35° C. |
| 3–4 | 300 psi | 3 | 40° C. |
| 4–5 | 300 psi | 4 | 50° C. |
|  |  | 5 | 35° C. |

After refining, the average particle size of the exiting product (having a temperature of 37° C.) was 0.0006 inches (15 microns). The refined material was then delivered by steel belts to a water-jacketed horizontal mixer with a jacket temperature of 49° C. The soy lecithin, Brown Lake Colors, and David Michael Chili Flavor were added to the refined material and the resulting mixture was mixed for approximately 20 minutes at a temperature of 47° C. After mixing, the remainder of the oil was added, and the mixture was again mixed for about 30 minutes at 49° C.

The final product had an average particle size of 0.0006 inches (15 microns). The product was then placed on a fiber belt and passed through a cooling tunnel having three cooling zones with temperatures as follows: first cooling zone—10° C.; second cooling zone—10° C.; and third cooling zone—18° C. The chili coating had a very strong flavor.

Example 9B

Chili Flavored Coating

The same procedure was followed in this example as with Example 9A above except that half of the McCorrnick Chili Seasoning Flavor was added before refining and half was added after refining.

The following ingredients were used to prepare a chili flavored coating:

|  | Concentration % wt.[a] |
|---|---|
| Ingredients Added To Kneader Mixer |  |
| palm kernel oil | 20.0 |
| soy lecithin | 0.10 |
| all purpose flour | 33.17 |
| whey | 23.41 |
| salt | 0.94 |
| McCormick Chili Seasoning Flavor | 3.0 |
| Ingredients Added After Refining |  |
| palm kernel oil | 14.43 |
| soy lecithin | 0.40 |
| Brown Lake Colors | 1.25 |
| McCormick Chili Seasoning Flavor | 3.0 |
| David Michael Chili Flavor | 0.30 |

[a]Percent by weight based upon the total weight of ingredients used (i.e., ingredients added to the kneader mixer plus the ingredients added after refining).

The product formed in this example had a strong chili flavor, but not as strong as the flavor of the product formed in Example 9A.

Example 9C

Chili Flavored Coating

The same procedure was followed in this example as with Examples 9A and 9B above except that all of the McCormick Chili Seasoning Flavor was added after refining.

The following ingredients were used to prepare a chili flavored coating:

|  | Concentration % wt.[a] |
|---|---|
| Ingredients Added To Kneader Mixer |  |
| palm kernel oil | 20.0 |
| soy lecithin | 0.10 |
| all purpose flour | 33.17 |
| whey | 23.41 |
| salt | 0.94 |
| Ingredients Added After Refining |  |
| palm kernel oil | 14.43 |
| soy lecithin | 0.40 |
| Brown Lake Colors | 1.25 |
| McCormick Chili Seasoning Flavor | 6.0 |
| David Michael Chili Flavor | 0.30 |

[a]Percent by weight based upon the total weight of ingredients used (i.e., ingredients added to the kneader mixer plus the ingredients added after refining).

The product formed in this example had a weaker chili flavoring than the product formed in Example 9B. When compared to the product formed in Example 9A, the chili flavor was much weaker indicating that refining the chili seasoning greatly improves homogeneous distribution of the seasoning throughout the product.

Example 10A

Chili Cheese Flavored Coating

The following ingredients were used to prepare a chili cheese flavored coating:

| | Concentration % wt.[a] |
|---|---|
| Ingredients Added To Kneader Mixer | |
| fractionated palm kernel oil | 20.0 |
| soy lecithin | 0.10 |
| Land O' Lakes cheese powder | 20.0 |
| whey | 25.0 |
| maltodextrin | 13.7 |
| lactic acid | 2.3 |
| chili seasoning | 4.0 |
| Ingredients Added After Refining | |
| fractionated palm kernel oil | 14.0 |
| soy lecithin | 0.40 |
| orange color | 0.50 |

[a]Percent by weight based upon the total weight of ingredients used (i.e., ingredients added to the kneader mixer plus the ingredients added after refining).

The same equipment was used in this production run as was used in the previous examples. The soy lecithin, cheese powder, whey, maltodextrin, lactic acid, and chili seasoning were added to a chocolate style kneader. The jacketed kneader was water heated to, and maintained at, 49° C. The dry ingredients were blended for about three minutes to ensure thorough distribution of the chili seasoning, after which 20% by weight of palm kernel oil was added at a temperature of 50° C. The addition of the oil was critical for ensuring optimum small particle size and excellent particle size distribution. The resulting material was mixed until the dry material was completely mixed with oil (about 20 minutes). The final mixed ingredients were then transported via a jacketed auger at a temperature of 49° C. to a two roll pre-refiner. The average particle size of the product upon exiting the pre-refiner was 0.002 inches (50 microns).

The pre-refined material was then transported to a five roll refiner at a temperature of 46° C.

The roll pressures and temperatures used in this example were as follows:

| Between Roll #'s | Pressure | Roll # | Temperature |
|---|---|---|---|
| 1–2 | 600 psi | 1 | 35° C. |
| 2–3 | 300 psi | 2 | 35° C. |
| 3–4 | 300 psi | 3 | 40° C. |
| 4–5 | 300 psi | 4 | 50° C. |
| | | 5 | 35° C. |

After refining, the average particle size of the exiting product (having a temperature of 37° C.) was 0.0006 inches (15 microns). The refined material was then delivered by steel belts to a water-jacketed horizontal mixer with a jacket temperature of 49° C. The soy lecithin and orange color were added to the refined material and the resulting mixture was mixed for approximately 20 minutes at a temperature of 47° C. After mixing, the remainder of the oil was added, and the mixture was again mixed for about 30 minutes at 49° C. The final product had an average particle size of 0.0006 inches (15 microns). The product was then placed on a fiber belt and passed through a cooling tunnel having three cooling zones with temperatures as follows: first cooling zone—10° C.; second cooling zone—10° C.; and third cooling zone—18° C. The chili cheese coating had a very strong flavor.

Example 10B

Chili Cheese Flavored Coating

The same procedure was followed in this example as with Example 10A above except that half of the chili seasoning was added before refining and half was added after refining.

The following ingredients were used to prepare a chili flavored coating:

| | Concentration % wt.[a] |
|---|---|
| Ingredients Added To Kneader Mixer | |
| fractionated palm kernel oil | 20.0 |
| soy lecithin | 0.10 |
| Land O' Lakes cheese powder | 20.0 |
| whey | 25.0 |
| maltodextrin | 13.7 |
| chili seasoning | 2.0 |
| Ingredients Added After Refining | |
| fractionated palm kernel oil | 14.0 |
| soy lecithin | 0.40 |
| orange color | 0.5 |
| chili seasoning | 2.0 |

[a]Percent by weight based upon the total weight of ingredients used (i.e., ingredients added to the kneader mixer plus the ingredients added after refining).

The product formed in this example had a strong chili cheese flavor, but not as strong as the flavor of the product formed in Example 10A.

Example 10C

Chili Cheese Flavored Coating

The same procedure was followed in this example as with Examples 10A and 10B above except that all of the chili seasoning was added after refining.

The following ingredients were used to prepare a chili cheese flavored coating:

| | Concentration % wt.[a] |
|---|---|
| Ingredients Added To Kneader Mixer | |
| fractionated palm kernel oil | 20.0 |
| soy lecithin | 0.10 |
| Land O' Lakes cheese powder | 20.0 |
| whey | 25.0 |
| maltodextrin | 13.7 |
| lactic acid | 2.3 |
| Ingredients Added After Refining | |
| fractionated palm kernel oil | 14.0 |
| soy lecithin | 0.40 |
| orange color | 0.5 |
| chili seasoning | 4.0 |

[a]Percent by weight based upon the total weight of ingredients used (i.e., ingredients added to the kneader mixer plus the ingredients added after refining).

The product formed in this example had a weaker chili cheese flavoring than the product formed in Example 10B. When compared to the product formed in Example 10A, the chili cheese flavor was much weaker, indicating that refining the chili seasoning greatly improves homogeneous distribution of the seasoning throughout the product.

Example 11A

Corn Chip Coating

The following ingredients were used to prepare a corn chip coating:

|  | Concentration % wt.[a] |
| --- | --- |
| Ingredients Added To Kneader Mixer | |
| palm kernel oil | 20.0 |
| soy lecithin | 0.1 |
| Chadasharp 300 | 15.0 |
| whey | 34.5 |
| crushed FRITO ® corn chips | 5.0 |
| nonfat dry milk | 9.0 |
| Ingredients Added After Refining | |
| palm kernel oil | 16.0 |
| soy lecithin | 0.4 |

[a]Percent by weight based upon the total weight of ingredients used (i.e., ingredients added to the kneader mixer plus the ingredients added after refining).

FRITO® corn chips were purchased whole and ground using a Fitz type mill until all of the final pieces could pass through a #6 Taylor U.S. Screen. The ground chips, whey, soy lecithin, Chadasharp 300, and nonfat dry milk were added to a hot water jacketed Buhler SMC-1500 chocolate style kneader equipped with dual paddles and temperature controls (all Buhler equipment is available from Buhler, Inc. in Minneapolis, Minn.). The 20% by weight of palm kernel oil was added to the kneader at 46° C., and the entire kneader system was water jacket heated to 49° C. The ingredients were mixed until all of the dry particles were thoroughly wet with oil (approximately 15–30 minutes). After mixing, the mixture had a temperature of 48° C. The mixture was transferred from the kneader via a heated auger at a temperature of 46° C. to a Buhler-Miag SZA-900 two roll pre-refining system. The temperature of the rolls was cooled to approximately 21–24° C. Upon exiting the pre-refiner, the particle size of the material had been reduced to about 0.002–0.003 inches (50–70 microns). The mixture, which had a dry consistency and a temperature of approximately 46° C., was moved by steel belts to the finishing refiners.

The finishing refiners consisted of two, Buhler SFL-1300 five roll refiners with independent pressure and temperature controls. The roll pressures and temperatures used in this example were as follows:

| Between Roll #'s | Pressure | Roll # | Temperature |
| --- | --- | --- | --- |
| 1–2 | 600 psi | 1 | 35° C. |
| 2–3 | 300 psi | 2 | 35° C. |
| 3–4 | 300 psi | 3 | 40° C. |
| 4–5 | 300 psi | 4 | 50° C. |
|  |  | 5 | 35° C. |

After passing through the finishing refiners, the particles of the mixture had an average size of about 0.0008–0.0010 inches (20–25 microns). The exiting mixture (having a temperature of 36° C and a free-flowing powdery consistency) was transported on a metal belt past a series of magnets which removed any dust-sized metal fragments.

The steel belts delivered the powder to a conventional horizontal, jacketed mixing tank fitted with paddle-type agitators. A small amount of palm kernel oil was added to the powder mixture to form a thick slurry which was mixed for approximately 20 minutes at 49° C. After mixing, the remainder of the palm kernel oil (which had been heated to 46° C.) and the soy lecithin was added to the mixture in the tank followed by 40 minutes of mixing, while continuing to maintain the temperature at 49° C.

The final product had an average particle size of 0.0009 inches (23 microns) and a strong, uniform corn chip flavoring.

Example 11B

Corn Chip Coating

The same procedure was followed in this example as with Example 11A above except that half of the corn chips was added before refining and half was added after refining.

The following ingredients were used to prepare a corn chip coating:

|  | Concentration % wt.[a] |
| --- | --- |
| Ingredients Added To Kneader Mixer | |
| palm kernel oil | 20.0 |
| soy lecithin | 0.1 |
| Chadasharp 300 | 15.0 |
| whey | 34.5 |
| crushed FRITO ® corn chips | 2.5 |
| nonfat dry milk | 9.0 |
| Ingredients Added After Refining | |
| palm kernel oil | 16.0 |
| soy lecithin | 0.4 |
| crushed FRITO ® corn chips | 2.5 |

[a]Percent by weight based upon the total weight of ingredients used (i.e., ingredients added to the kneader mixer plus the ingredients added after refining).

The product formed in this example had a strong corn chip flavor, but not as strong or uniform as the flavor of the product formed in Example 11A.

Example 11C

Corn Chip Coating

The same procedure was followed in this example as with Examples 11A and 11B above except that all of the corn chips were added after refining.

The following ingredients were used to prepare a corn chip coating:

|  | Concentration % wt.[a] |
| --- | --- |
| Ingredients Added To Kneader Mixer | |
| palm kernel oil | 20.0 |
| soy lecithin | 0.1 |
| Chadasharp 300 | 15.0 |
| whey | 34.5 |
| nonfat dry milk | 9.0 |
| Ingredients Added After Refining | |
| palm kernel oil | 16.0 |
| soy lecithin | 0.4 |
| crushed FRITO ® corn chips | 5.0 |

[a]Percent by weight based upon the total weight of ingredients used (i.e., ingredients added to the kneader mixer plus the ingredients added after refining).

The product formed in this example had a weaker corn chip flavoring than the product formed in Example 11B. When compared to the product formed in Example 11A, the corn chip flavor was much weaker, indicating that refining the corn chips greatly improves homogeneous distribution of the chips throughout the product.

We claim:

1. A food product comprising a component selected from the group consisting of fruits, cheeses, and cookie materials, wherein the average particle size of said food product is from about 0.0006–0.0012 inches.

2. The product of claim 1, wherein said average particle size is about 0.0007–0.0010 inches.

3. The product of claim 2, wherein said average particle size is about 0.0008 inches.

4. The product of claim 1, wherein the total moisture content of the product is less than about 5% by weight based on the total weight of the product.

5. The product of claim 4, wherein the total moisture content is less than about 2% by weight.

6. The product of claim 1, wherein said component is cheese.

7. The product of claim 1, wherein said component is fruit.

8. The product of claim 1, wherein said component is cookie materials.

9. The product of claim 1, said product further including an emulsifier.

10. The product of claim 9, wherein said emulsifier is selected from the group consisting of lecithins, monoglycerides, and diglycerides.

11. The product of claim 1, wherein said product includes a fat.

12. The product of claim 11, wherein said fat is a hydrogenated vegetable oil.

13. A food product comprising a component selected from the group consisting of seasonings, snack chips, and mixtures thereof wherein the average particle size of said food product is from about 0.0006–0.0012 inches.

14. The product of claim 13, wherein said average particle size is about 0.0007–0.0010 inches.

15. The product of claim 13, wherein the total moisture content of the product is less than about 5% by weight based on the total weight of the product.

16. The product of claim 13, wherein said component is a seasoning.

17. The product of claim 16, wherein said seasoning is a chili seasoning.

18. The product of claim 13, wherein said component is a snack chip.

19. The product of claim 18, wherein said snack chip is selected from the group consisting of corn-based chips, potato-based chips, wheat-based chips, and mixtures thereof.

20. A process for making a food product comprising the steps of:
(a) providing a quantity of a mixture of food ingredients, said mixture having a moisture level sufficient to permit physical reduction of the particle size thereof and including a component selected from the group consisting of fruits, cheeses, and cookie materials; and
(b) passing said mixture through a series of progressively smaller refining gaps each formed between closely adjacent, axially rotatable rollers so as to reduce the particle size thereof.

21. The process of claim 20, wherein said passing step (b) comprises reducing the average particle size of said mixture to less than about 0.0090 inches.

22. The process of claim 21, wherein said passing step (b) comprises reducing the average particle size of said mixture to from about 0.0006–0.001 inches.

23. The process of claim 20, wherein the product resulting from said passing step (b) has a total moisture content of less than about 5% by weight, based upon the total weight of the product taken as 100% by weight.

24. The process of claim 20, wherein said component is selected from the group consisting of cheese and fruit.

25. The process of claim 20, wherein said mixture further comprises a compound selected from the group consisting of emulsifiers and fats.

26. The process of claim 20, wherein said passing step (b) comprises passing said mixture through a five roll refiner.

27. The process of claim 26, wherein said passing step (b) further comprises passing said mixture through a two roll refiner prior to passing said mixture through the five roll refiner.

28. A process for making a food product comprising the steps of:
(a) providing a quantity of a mixture of food ingredients, said mixture having a moisture level sufficient to permit physical reduction of the particle size thereof and including a component selected from the group consisting of seasonings and snack chips; and
(b) passing said mixture through a series of progressively smaller refining gaps each formed between closely adjacent, axially rotatable rollers so as to reduce the particle size thereof.

29. The process of claim 28, wherein said passing step (b) comprises reducing the average particle size of said mixture to less than about 0.0090 inches.

30. The process of claim 29, wherein said passing step (b) comprises reducing the average particle size of said mixture to from about 0.0006–0.0012 inches.

31. The process of claim 28, wherein the product resulting from said passing step (b) has a total moisture content of less than about 5% by weight, based upon the total weight of the product taken as 100% by weight.

32. The process of claim 28, wherein said component is a chili seasoning.

33. The process of claim 28, wherein said component is a snack chip selected from the group consisting of cam-based chips, potato-based chips, wheat-based chips, and mixtures thereof.

34. The process of claim 28, wherein said mixture further comprises a compound selected from the group consisting of emulsifiers and fats.

35. The process of claim 28, wherein said passing step (b) comprises passing said mixture through a five roll refiner.

36. The process of claim 35, wherein said passing step (b) further comprises passing said mixture through a two roll refiner prior to passing said mixture through the five roll refiner.

* * * * *